(12) United States Patent
Citko et al.

(10) Patent No.: US 10,363,897 B2
(45) Date of Patent: Jul. 30, 2019

(54) PASSENGER AIRBAG MODULE

(71) Applicant: GM GLOBAL TECHNOLOGY OPERATIONS LLC, Detroit, MI (US)

(72) Inventors: Steven M. Citko, Beverly Hills, MI (US); Shawn D. Burney, Macomb Township, MI (US); Christopher R. Phelps, Almont, MI (US); Brian McPeck, Macomb Township, MI (US); Robert J. Schlenke, Fenton, MI (US); George Helou, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 15/722,080

(22) Filed: Oct. 2, 2017

(65) Prior Publication Data
US 2019/0100164 A1    Apr. 4, 2019

(51) Int. Cl.
| | | |
|---|---|---|
| *B60R 21/217* | (2011.01) | |
| *B60R 21/215* | (2011.01) | |
| *B60R 21/21* | (2011.01) | |
| *B60R 21/205* | (2011.01) | |
| *B60R 21/16* | (2006.01) | |

(52) U.S. Cl.
CPC ............ *B60R 21/215* (2013.01); *B60R 21/21* (2013.01); *B60R 21/2171* (2013.01); *B60R 21/205* (2013.01); *B60R 2021/161* (2013.01); *B60R 2021/2177* (2013.01); *B60R 2021/21506* (2013.01)

(58) Field of Classification Search
CPC .. B60R 21/215; B60R 21/2171; B60R 21/205
See application file for complete search history.

(56) References Cited

U.S. PATENT DOCUMENTS

| | | | | |
|---|---|---|---|---|
| 4,941,678 | A * | 7/1990 | Lauritzen | ............ B60R 21/2171 220/315 |
| 5,069,480 | A * | 12/1991 | Good | .................. B60R 21/2171 280/732 |
| 5,433,471 | A * | 7/1995 | Shepherd | ............ B60R 21/2171 280/728.2 |
| 5,511,819 | A * | 4/1996 | Spilker | ............... B60R 21/2171 220/615 |
| 5,588,667 | A * | 12/1996 | Emambakhsh | ....... B60R 21/201 280/728.2 |
| 5,732,971 | A * | 3/1998 | Lutz | ...................... B60R 21/201 280/728.2 |
| 6,161,862 | A * | 12/2000 | Rose | ................... B60R 21/2171 280/728.2 |
| 6,161,865 | A * | 12/2000 | Rose | ................... B60R 21/2171 280/728.2 |

(Continued)

*Primary Examiner* — Karen Beck (57) ABSTRACT

One general aspect includes an airbag module, including: a housing. The airbag module also includes a cushion disposed within the housing. The airbag module also includes a chute having a first side and a second side with a seam centrally formed therebetween, where each of the first and second sides include a plurality of fingers which operatively cooperate to define a track configured to slidably attach the housing to the chute such that the chute sufficiently encloses the cushion within the housing, and where the chute is configured to open during deployment of the cushion.

16 Claims, 8 Drawing Sheets

(56) References Cited

U.S. PATENT DOCUMENTS

| | | | | |
|---|---|---|---|---|
| 7,007,970 | B2* | 3/2006 | Yasuda | B29C 65/06 |
| | | | | 280/728.3 |
| 9,457,760 | B1* | 10/2016 | Raines | B60R 21/239 |
| 9,789,836 | B2* | 10/2017 | Byers | B60R 21/205 |
| 2006/0290109 | A1* | 12/2006 | Kielinen | B60R 21/205 |
| | | | | 280/728.2 |
| 2007/0007753 | A1* | 1/2007 | Williams | B60R 21/217 |
| | | | | 280/728.2 |
| 2007/0187930 | A1* | 8/2007 | Chitteti | B60R 21/2165 |
| | | | | 280/728.2 |
| 2008/0073884 | A1* | 3/2008 | Kutchey | B60R 21/205 |
| | | | | 280/728.3 |
| 2014/0167396 | A1* | 6/2014 | Webber | B60R 21/2155 |
| | | | | 280/743.1 |
| 2016/0075301 | A1* | 3/2016 | Kwasnik | B60R 21/2165 |
| | | | | 280/728.3 |
| 2017/0158157 | A1* | 6/2017 | Webber | B60R 21/2176 |

* cited by examiner

PASSENGER AIRBAG MODULE

Airbags and their use as a safety mechanism in motor vehicles, such as automobiles, are widespread and mainstream. In many vehicles, passenger airbags are currently designed to be integrated within the instrument panel assembly and can deploy within the vehicle interior. In addition, airbags are being located in increased areas to add additional protection to a driver and any passengers in the vehicle. As a result, airbag modules are becoming more complex to ensure proper deployment as well as proper positioning within the instrument panel assembly. This causes the manufacturing process for these modules to require the assistance of intricate tools and vision systems to verify module assembly has been completed correctly. In many instances, airbag modules are unserviceable if they are accidentally misassembled during manufacture. It is therefore desirable to develop an airbag module which does not require tools and vision systems during manufacture and the module may be serviced if misassembled.

SUMMARY

One general aspect includes an airbag module, including: a housing. The airbag module also includes a cushion disposed within the housing. The airbag module also includes a chute having a first side and a second side with a seam centrally formed therebetween, where each of the first and second sides include a plurality of fingers which operatively cooperate to define a track configured to slidably attach the housing to the chute such that the chute sufficiently encloses the cushion within the housing, and where the chute is configured to open during deployment of the cushion.

Implementations may include one or more of the following features. The airbag module where: the housing includes a retaining tab; the chute includes a retaining base. The airbag module may also include where, when the housing is sufficiently slidably attached to the chute, the retaining tab and retaining base are operatively positioned to receive a joining mechanism which affixes the housing to the chute. The airbag module where each of the fingers have a first end and a second end, the first end being connected to the first or second side of the chute, and the second end laterally projecting from the finger towards the centrally formed seam so as to provide the finger with an inverted-"L" shape. The airbag module where the first and second side include five fingers. The airbag module where housing includes a plurality of protuberances configured to align with the second end of the fingers when the housing is sufficiently slidably attached to the chute. The airbag module where the housing and chute are constructed from a rigid material. The airbag module where the rigid material is steel, fiberglass, or thermal plastic. The airbag module where the chute includes a first plate perforationably connected to the first side and a second plate perforationably connected to the second side, where the seam is centrally formed between the first and second plates, and where the first and second plates and the seam correspond to define a door configured to open during deployment of the cushion. The airbag module where a lattice pattern reinforces the structural integrity of the first and second plates. The airbag module where the chute is affixed to an instrument panel assembly.

One general aspect includes an airbag module, including: a rigid housing including a retaining tab and a plurality of peripherally extending protuberances. The airbag module also includes a cushion disposed within the housing. The airbag module also includes a rigid chute including a retaining base, the chute having a first side with a perforationably connected first plate and a second side with a perforationably connected second plate and a seam centrally formed between the first and second plate, where the first and second plates and seam correspond to define a door configured to open during deployment of the cushion, and where each of the first and second sides include at least five inverted-"L" shape fingers that operatively cooperate to define a track configured to slidably attach the housing to the chute such that the chute sufficiently encloses the cushion within the housing. The airbag module also includes, when the housing is sufficiently slidably attached to the chute, the protuberances align with the fingers and the retaining tab and retaining base are operatively positioned to receive a joining mechanism which affixes the housing to the chute. The airbag module also includes where a lattice pattern reinforces the structural integrity of the first and second plates.

Implementations may include one or more of the following features. The airbag module where the housing and chute are constructed from steel, fiberglass, or thermal plastic. The airbag module where the chute is affixed to an instrument panel assembly.

One general aspect includes a method of constructing an airbag module, the method including: providing a rigid housing including a retaining tab and a plurality of peripherally extending protuberances. The method also includes disposing a cushion within the housing. The method also includes providing a rigid chute including a retaining base, the chute having a first side with a perforationably connected first plate and a second side with a perforationably connected second plate and a seam centrally formed between the first and second plate, where the first and second plates and seam correspond to define a door configured to open during deployment of the cushion, and where each of the first and second sides include a plurality of inverted-"L" shape fingers that operatively cooperate to define a track. The method also includes sliding the housing along the chute via the track until the cushion is sufficiently enclosed within the housing. The method also includes aligning the protuberances with the fingers such that each protuberance is positioned beneath a portion of the corresponding finger. The method also includes aligning the retaining tab and retaining base. The method also includes affixing the housing to the chute by operatively attaching the retaining tab and retaining base via a joining mechanism.

Implementations may include one or more of the following features. The method further including affixing the chute to an instrument panel assembly. The method reinforcing the structural integrity of the first and second plates with a lattice pattern.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
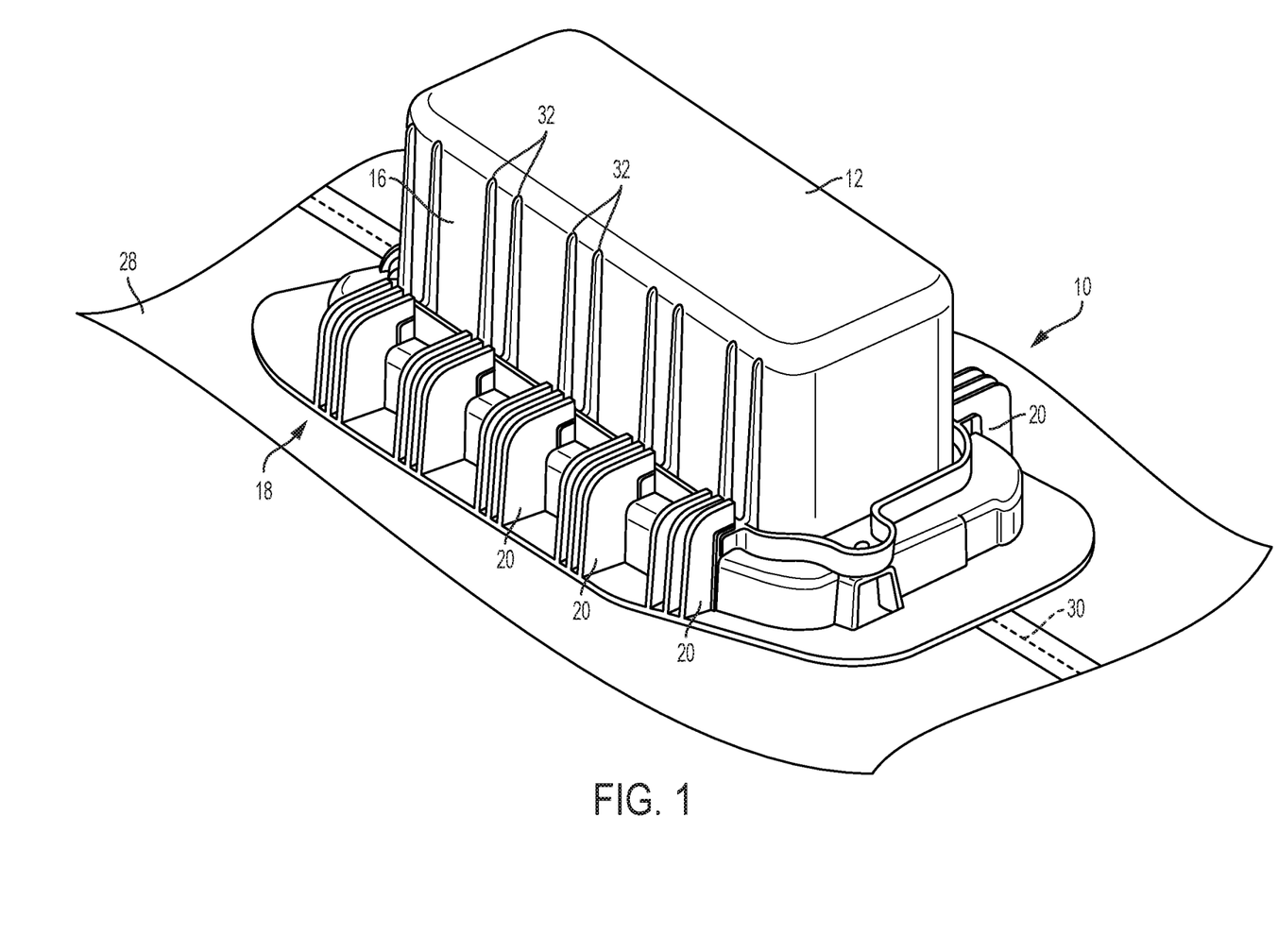
FIG. 1 shows a perspective view of an airbag module according to an embodiment.
Figure 1A:
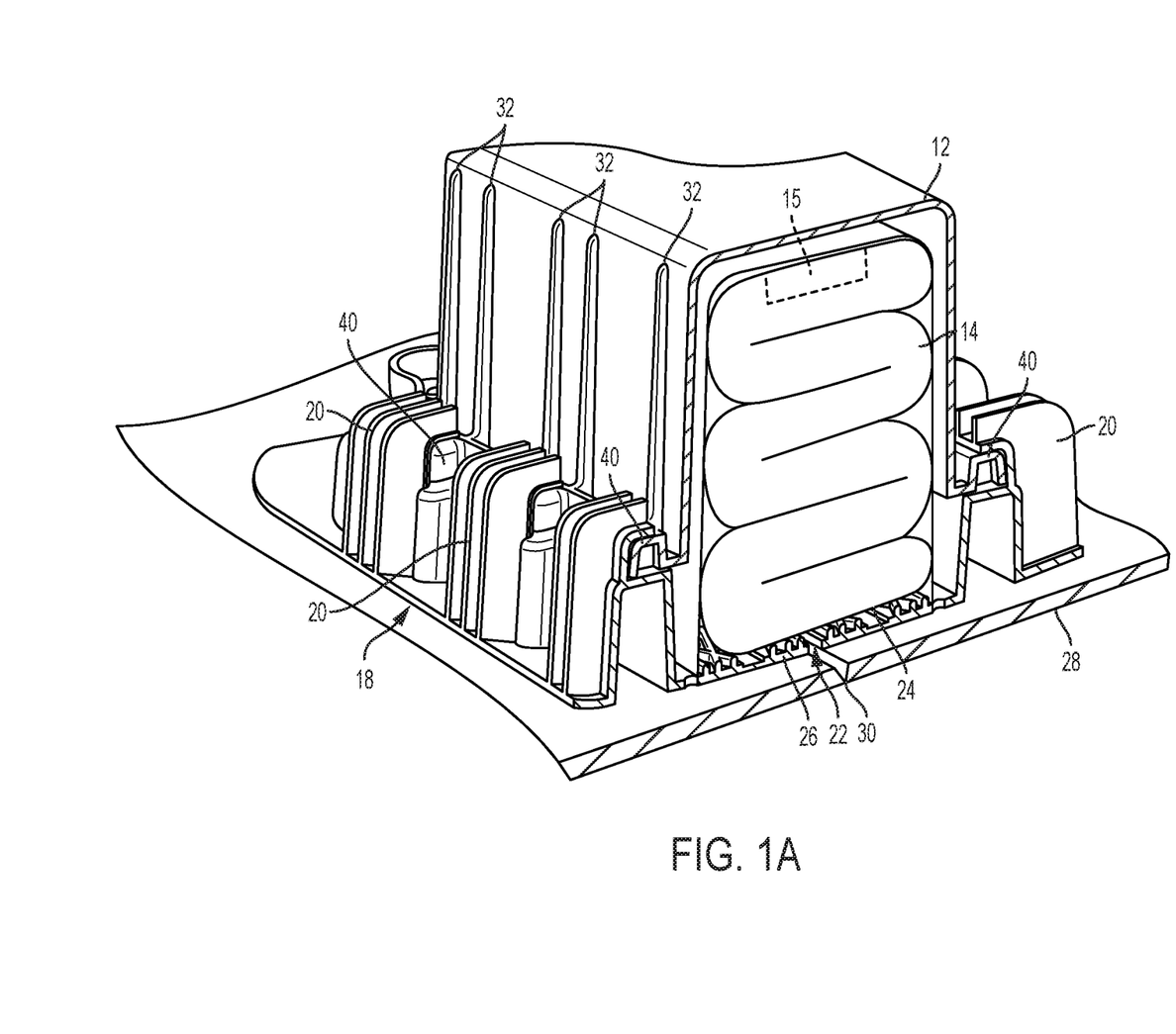
FIG. 1A shows a perspective cut-away view of the airbag module of FIG. 1.

As shown in FIGS. 1 and 1A, airbag module 10 includes a generally rectangular-shaped housing 12 that includes a cushion 14 disposed within the confines of the four housing sidewalls 16. To inflate cushion 14, airbag module 10 also includes an inflator 15 that rapidly releases gas within cushion 14 and causes the rapid expansion thereof.

To enclose housing 12 after cushion 14 has been folded therein, airbag module 10 includes a chute 18 in which housing 12 can slidably attach via a track established by a number of fingers 20 (discussed below). Chute 18 includes a seam 22 formed centrally between two reinforced plates, a first plate 24 and second plate 26, of the same size and shape and each being connected to the sides of chute 18 by perforations. During the rapid inflation of cushion 14, seam 22 and plates 24, 26 correspond to define a door (which will open after the first and second plate 24, 26 break away from each other by bending at the perforations) that allows cushion 14 to escape from housing 12 to properly deploy. Chute 18 is moreover affixed to an underside of the passenger-side instrument panel 28 (e.g., via a bracket). To assist in ensuring that cushion 14 properly deploys from airbag module 10, the instrument panel 28 may also include an internal seam 30 which is aligned with chute seam 22. Accordingly, when cushion 14 is inflated and the chute door opens, the internal instrument panel seam 30 will also open to allow cushion 14 to break through instrument panel 28 and fully inflate within a vehicle interior (not shown).

During release of the rapidly expanding inflator gases, cushion 14 will expand in all directions. That is, the force of the rapidly expanding gas is not only directed toward the chute seam 22, but rather the force will also be directed at the sidewalls 16 of housing 12 and the first and second plates 24, 26 of chute 18. To ensure that housing 12 maintains structural integrity while experiencing these forces, housing 12 may be formed of rigid materials such as, but not limited to, steel, fiberglass, or thermal plastic and may also include a number of ribs 32. Moreover, chute 18 may also be formed of these exemplary rigid materials and the first and second plates 24, 26 may further include a lattice pattern 34 so as to maintain structural integrity while experiencing the deployment of cushion 14. In this embodiment, the lattice pattern 34 consists of diagonally crossed ridges molded to one side of the first and second plates 24, 26; however, it should be understood that the lattice pattern 34 may have different patterns to maintain plate structural integrity.

Figure 2:
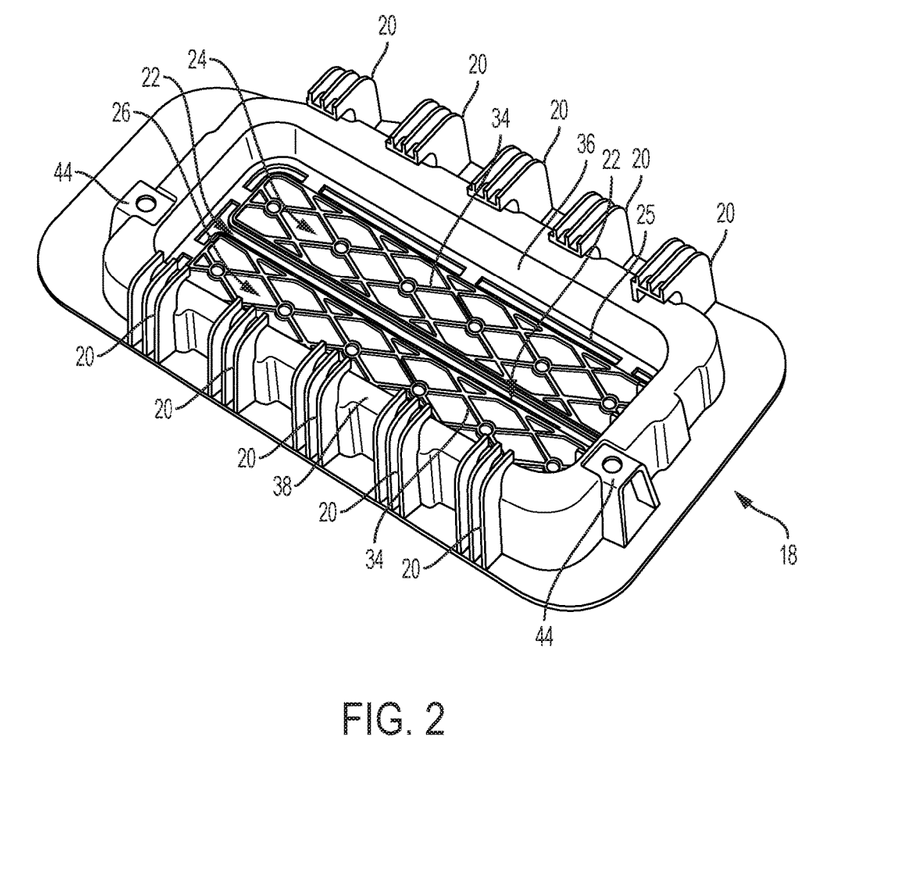
FIG. 2 shows a perspective view of a chute according to an embodiment.

As shown in FIG. 2, chute 18 is of a generally rectangular shape that corresponds with the shape of housing 12 and which includes a first elongated side 36 and a second elongated side 38. Consequently, three sides of the first plate 24 are connected to the first side 36 through perforations and, similarly, three sides of the second plate 26 are perforationably connected to the second side 38. Chute seam 22 is centrally formed between the first and second plates 24, 26.

Each of the first and second elongated sides 36, 38 include at least five fingers 20 each having an inverted-"L" shape of the same height and each being selectively located in series along their respective first/second elongated side 36/38. As such, one end of each finger 20 is connected to chute 18 and the opposite end juts out laterally from a bend in the finger 20 (i.e., creating an upside-down hook), towards chute seam 22 as well as a similarly situated finger 20 located directly across the chute 18. As a result, all fingers 20 of chute 18 cooperate to define a track along the length of chute 18 (i.e., a delineated path). It should be understood chute 18 can include more or less fingers 20 on each side and such fingers do not have to face a corresponding finger 20 on the opposite side of the chute 18.

Figure 3:
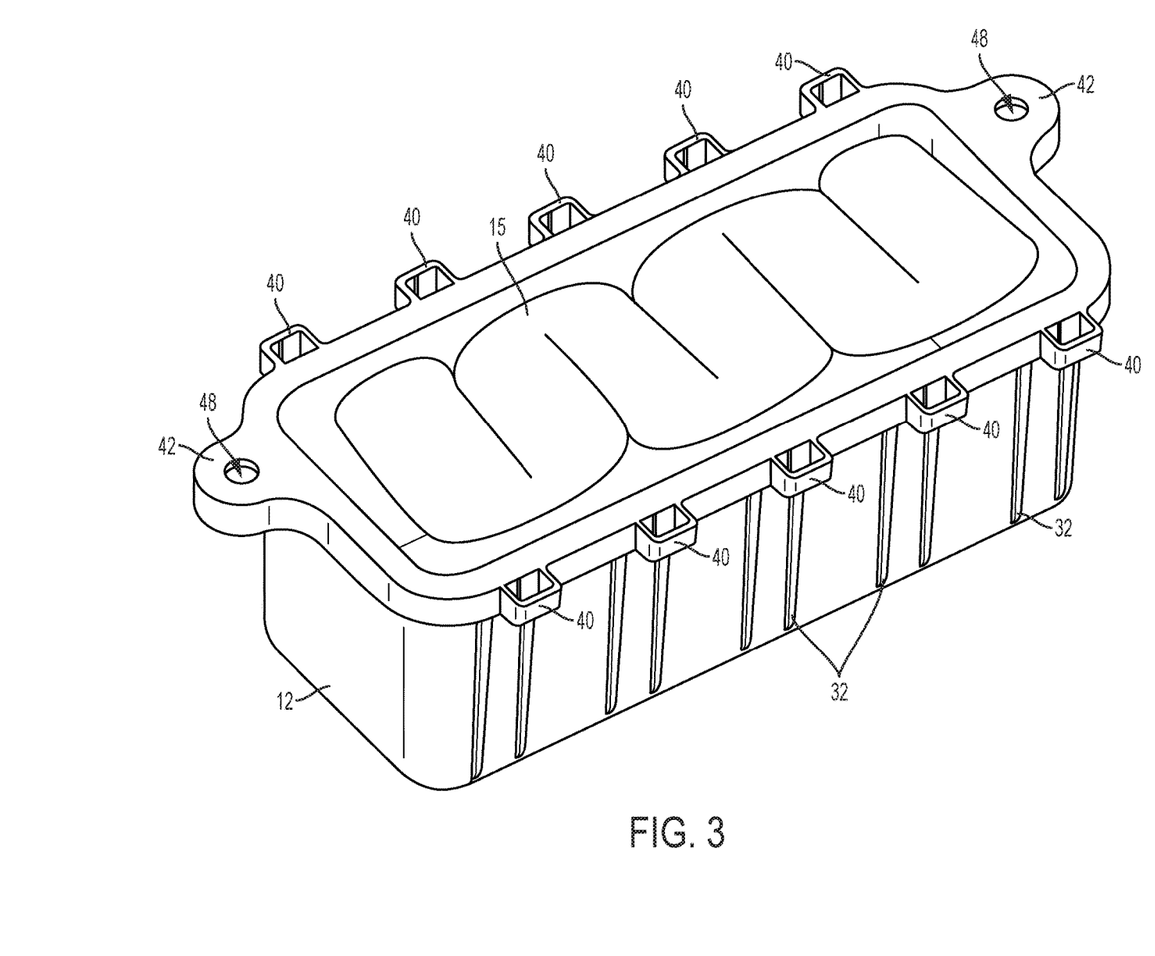
FIG. 3 shows a perspective view of a housing according to an embodiment.
Figure 4A:
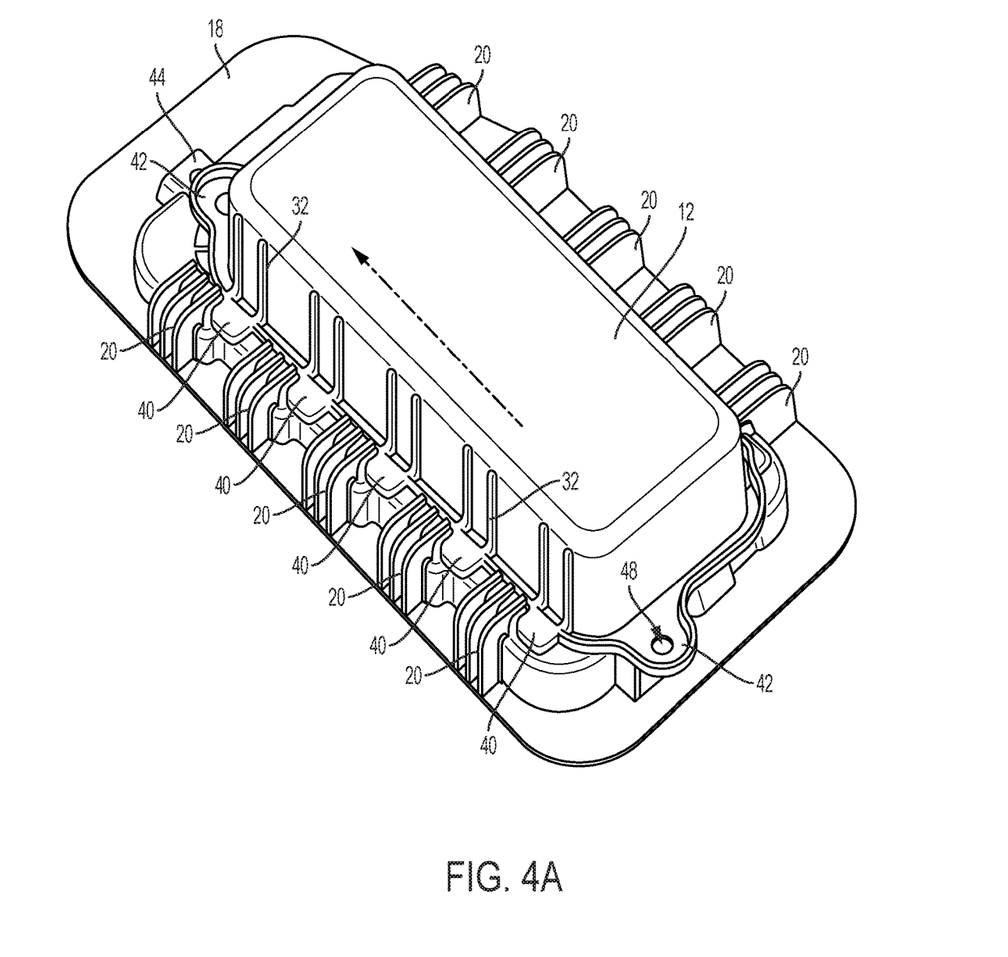
FIG. 4A shows a perspective view of an aspect of an airbag module according to an embodiment.
Figure 4B:
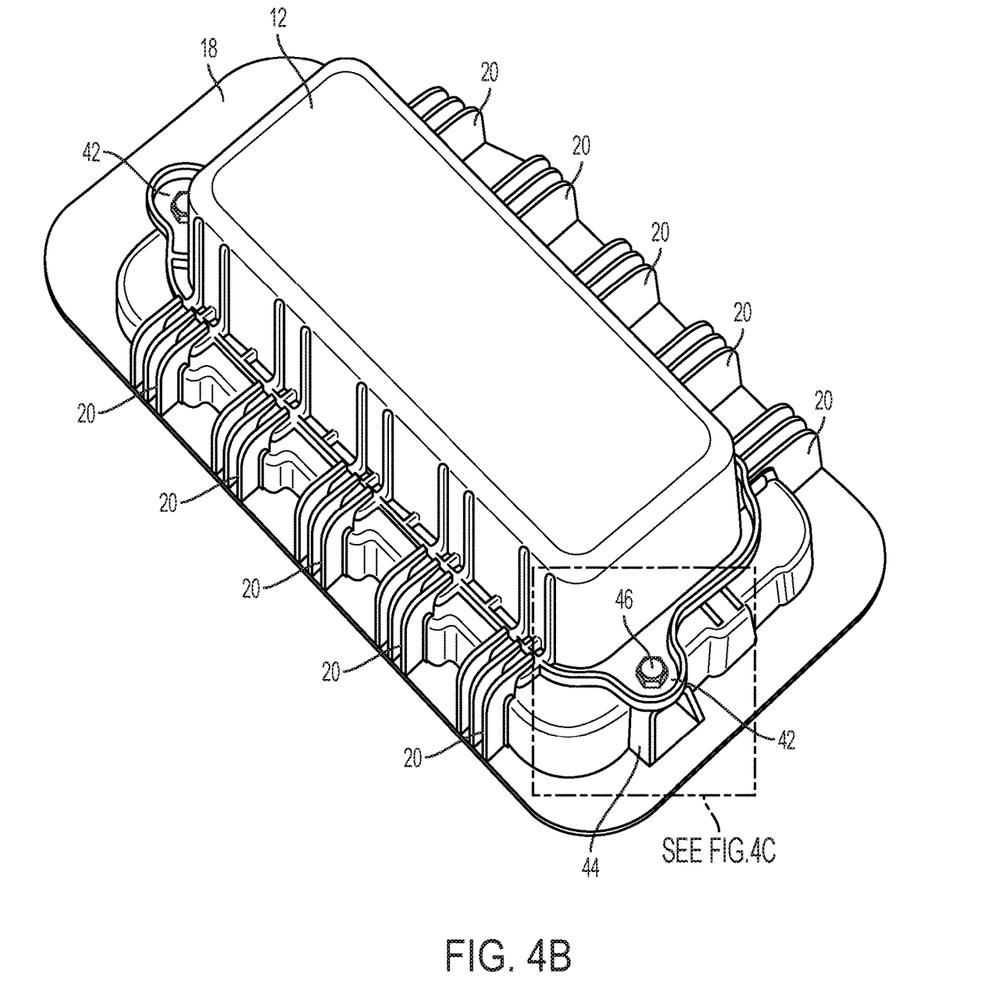
FIG. 4B shows a perspective view of another aspect of the airbag module of FIG. 4A.
Figure 4C:
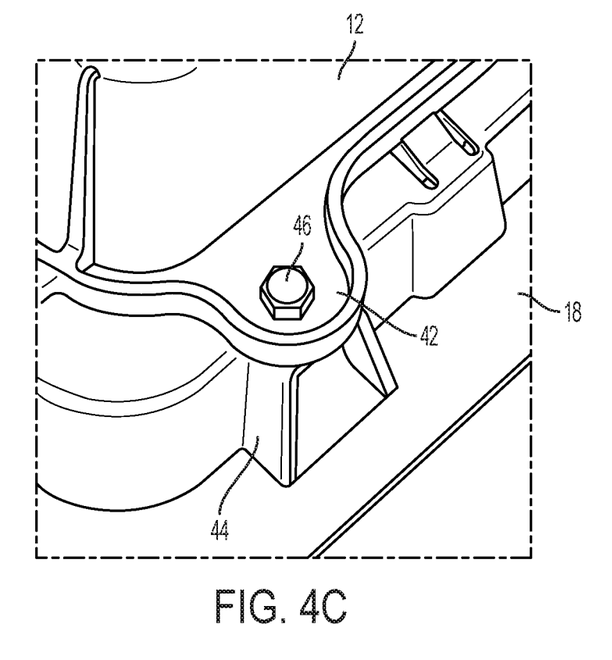
FIG. 4C shows a perspective view of a retainer tab and retainer base of the airbag module of FIG. 4A according to an embodiment.

As shown in FIGS. 3 through 4C, housing 12 can slide along chute 18 in a restrained manner via the track created by fingers 20. Moreover, housing 12 includes numerous lateral protuberances 40 that extend from the sides of housing 12. Each protuberance 40 is also formed to fit snugly underneath the lateral end of the corresponding finger 20 when the housing 12 and chute 18 are sufficiently aligned with each other (see FIG. 1A). As a result, the lateral end of the fingers 20 act as hooks to force attachment of the housing 12 to chute 18 via the protuberances 40. The protuberances 40 being underneath the fingers 20 also provides an indication that housing 12 and chute 18 are sufficiently aligned to create an attached relationship between the two components. Being sufficiently aligned should allow chute 18 to fully enclose cushion 14 and inflator 15 within the confines of housing 12.

With reference to FIG. 4C, each end of housing 12 includes a retainer tab 42 which extends from its peripheral edge. Similarly, each end of chute 18 is joined to a retainer base 44. The body of both tab 42 and base 44 also have an opening 48 shaped to receive a joining mechanism 46 such as, but not limited to, a screw or bolt. Therefore, upon aligning housing 12 and chute 18, both openings 48 will align to allow the joining mechanism 46 through each and permanently affix housing 12 to chute 18.

Figure 5:
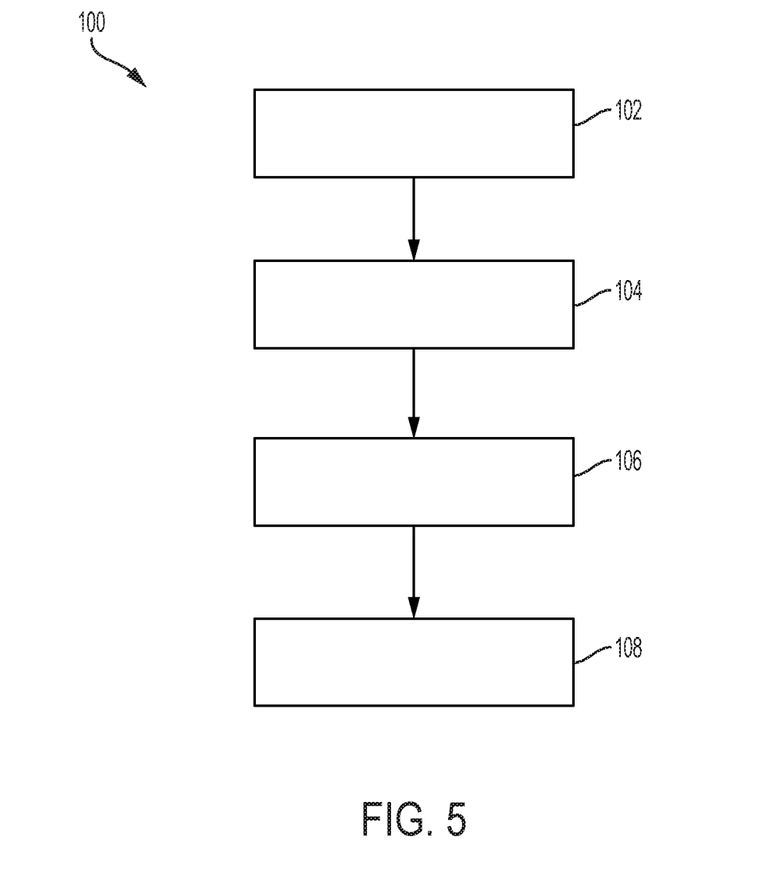
FIG. 5 shows a flowchart illustration an exemplary method of constructing an airbag module.

Referring now to FIG. 5, a method for constructing airbag module 10 begins at step 102 in which a manufacturer is provided the housing 12 having the cushion 14 disposed therein and a chute 18 (examples of each component being discussed above). In this step, moreover, the housing 12 is pressed against chute 18 and restrictively moved in a parallel direction along its top until cushion 14 is enclosed within housing 12 (see FIG. 4A). At step 104, the housing protuberances 40 are aligned underneath the lateral ends of fingers 20 (see FIG. 4B). At step 106, retaining tab 42 and base 44 are aligned with each other so both openings can properly receive a joining mechanism (see FIG. 4C). At step 108, the housing 12 is affixed to chute 18 by driving the joining mechanism 46 through the bodies of both tab 42 and base 44 (which may be a process that occurs at both ends of airbag module 10).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for."

What is claimed is:

1. An airbag module, comprising:
a housing comprising a retaining tab;
a cushion disposed within the housing; and
a chute having a first side and a second side with a seam centrally formed therebetween, wherein each of the first and second sides comprise a plurality of fingers which operatively cooperate to define a track configured to slidably attach the housing to the chute such that the housing is pressed against the chute and moved in a direction parallel to the seam of the chute until the chute sufficiently encloses the cushion within the housing, and wherein the chute is configured to open during deployment of the cushion, the chute further having a retaining base; and
wherein, when the housing is sufficiently slidably attached to the chute, the retaining tab and retaining base are operatively positioned to receive a joining mechanism which affixes the housing to the chute.

2. The airbag module of claim 1, wherein each of the fingers have a first end and a second end, the first end being connected to the first or second side of the chute, and the second end laterally projecting from the finger towards the centrally formed seam so as to provide the finger with an inverted-L shape.

3. The airbag module of claim 2, wherein the first and second side comprise five fingers.

4. The airbag module of claim 2, wherein housing comprises a plurality of protuberances configured to align with the second ends of the fingers when the housing is sufficiently slidably attached to the chute, wherein each protuberance of the plurality of protuberances is formed to fit snugly underneath the second end of a corresponding finger of the plurality of fingers when the housing is sufficiently slidably attached to the chute.

5. The airbag module of claim 1, wherein the housing and chute are constructed from a rigid material.

6. The airbag module of claim 5, wherein the rigid material is steel, fiberglass, or thermal plastic.

7. The airbag module of claim 1, wherein the chute comprises a first plate perforationably connected to the first side and a second plate perforationably connected to the second side, wherein the seam is centrally formed between the first and second plates, and wherein the first and second plates and seam correspond to define a door configured to open during deployment of the cushion.

8. The airbag module of claim 7, wherein a lattice pattern reinforces the structural integrity of the first and second plates, wherein the lattice pattern comprises diagonally crossed ridges molded to one side of the first and second plates.

9. The airbag module of claim 1, wherein the chute is affixed to an instrument panel assembly.

10. An airbag module, comprising:
a rigid housing comprising a retaining tab and a plurality of peripherally extending protuberances;
a cushion disposed within the housing; and
a rigid chute comprising a retaining base, the chute having a first side with a perforationably connected first plate and a second side with a perforationably connected second plate and a seam centrally formed between the first and second plate, wherein the first and second plates and seam correspond to define a door configured to open during deployment of the cushion, and wherein each of the first and second sides comprise at least five inverted-L shape fingers with a first and second end, wherein the second end laterally projects from its finger towards the centrally formed seam so as to provide the finger with the inverted-L shape, the fingers operatively cooperate to define a track configured to slidably attach the housing to the chute such that the housing is pressed against the chute and moved in a direction parallel to the seam of the chute until the chute sufficiently encloses the cushion within the housing;
when the housing is sufficiently slidably attached to the chute, the protuberances align with the second ends of the fingers and the retaining tab and retaining base are operatively positioned to receive a joining mechanism which affixes the housing to the chute, wherein each protuberance of the plurality of protuberances is fit snugly underneath the second end of a corresponding finger of the plurality of fingers when the housing is sufficiently slidably attached to the chute; and wherein a lattice pattern reinforces the structural integrity of the first and second plates, and wherein the lattice pattern comprises diagonally crossed ridges molded to one side of the first and second plates.

11. The airbag module of claim 10, wherein the housing and chute are constructed from steel, fiberglass, or thermal plastic.

12. The airbag module of claim 10, wherein the chute is affixed to an instrument panel assembly.

13. A method of constructing an airbag module, the method comprising:
provisioning a rigid housing comprising a retaining tab and a plurality of peripherally extending protuberances;
disposing a cushion within the housing;
providing a rigid chute comprising a retaining base, the chute having a first side with a perforationably connected first plate and a second side with a perforationably connected second plate and a seam centrally formed between the first and second plate, wherein the first and second plates and seam correspond to define a door configured to open during deployment of the cushion, and wherein each of the first and second sides comprise a plurality of inverted-L shape fingers with a first and second end, wherein the second end laterally project from its finger towards the centrally formed seam so as to provide the finger with the inverted-L shape, the fingers operatively cooperate to define a track;
sliding the housing along the chute via the track such that the housing is pressed against the chute and moved in a direction parallel to the seam of the chute until the cushion is sufficiently enclosed within the housing;
aligning the protuberances with the fingers such that each protuberance is positioned to fit snugly underneath the second end of a corresponding finger of the plurality of fingers;
aligning the retaining tab and retaining base; and
affixing the housing to the chute by operatively attaching the retaining tab and retaining base via a joining mechanism.

14. The method of claim 13, further comprising affixing the chute to an instrument panel assembly.

15. The method of claim 13, reinforcing the structural integrity of the first and second plates with a lattice pattern, wherein the lattice pattern comprises diagonally crossed ridges molded to one side of the first and second plates.

16. The method of claim 13, wherein the housing and chute are constructed from steel, fiberglass, or thermal plastic.

* * * * *